(12) United States Patent
Tranchina (10) Patent No.: US 7,145,445 B2
(45) Date of Patent: Dec. 5, 2006

(54) VEHICLE TIRE PRESSURE MONITOR

(75) Inventor: James R. Tranchina, Dix Hills, NY (US)

(73) Assignee: Audiovox Corporation, Hauppauge ( * ) Notice: Subject to any disclaimer, the term of this patent is extended or adjusted under 35 U.S.C. 154(b) by 508 days.

(21) Appl. No.: 10/706,828

(22) Filed: Nov. 12, 2003

(65) Prior Publication Data

US 2005/0099274 A1    May 12, 2005

(51) Int. Cl.
*B60C 23/00* (2006.01)
(52) U.S. Cl. ............... 340/447; 340/442; 340/445; 340/425.5; 340/426.1; 340/426.13; 73/146.2; 73/146.8
(58) Field of Classification Search ........... 340/442, 340/445, 447, 425.5, 426.1, 426.13, 426.14, 340/426.17, 426.33; 73/146.2, 146.8
See application file for complete search history.

(56) References Cited

U.S. PATENT DOCUMENTS

| | | | | | |
|---|---|---|---|---|---|
| 4,529,961 | A | * | 7/1985 | Nishimura et al. | 340/447 |
| 4,582,108 | A | * | 4/1986 | Markow et al. | 152/418 |
| 5,721,528 | A | * | 2/1998 | Boesch et al. | 340/442 |
| 5,774,048 | A | * | 6/1998 | Achterholt | 340/447 |
| 6,092,028 | A | * | 7/2000 | Naito et al. | 702/47 |
| 6,246,316 | B1 | * | 6/2001 | Andsager | 340/444 |

* cited by examiner

*Primary Examiner*—Daryl C Pope
(74) *Attorney, Agent, or Firm*—F. Chau & Associates, LL (57) ABSTRACT

A vehicle monitoring system comprises a tire pressure sensor, a transmitter coupled to the tire pressure sensor for wirelessly transmitting a signal indicative of a tire pressure; and a receiver for receiving the signal indicative of the tire pressure and for receiving a signal of a remote keyless entry device. The system further comprises a controller coupled to the receiver for processing the signal indicative of the tire pressure and outputting a status signal, and a status indicator for receiving the status signal and indicating a tire pressure status according to the status signal.

13 Claims, 7 Drawing Sheets

VEHICLE TIRE PRESSURE MONITOR

BACKGROUND OF THE INVENTION

1. Field of the Invention

The present invention relates to automotive electronics, and more particularly to tire pressure monitoring.

2. Discussion of Related Art

Proper tire pressure in automotive tires is important for ensuring safe handling, maintaining gas mileage, reducing tread wear, and preventing tire blowouts. Under-inflated or over-inflated tires can negatively affect the handling of a vehicle, resulting in under-steer, over-steer, and/or an increased tendency to hydroplane in wet conditions.

Under-inflation is a more common problem as tire pressure typically decreases over time. Under-inflated tires increase rolling resistance, decreasing gas mileage and increasing tire wear. Further, under-inflated tires flex greatly as they roll, the flexing generates heat as different layers of the tire rub against one another. The heat can reach temperatures beyond the operating parameters of the tire causing catastrophic tire failure.

These problems are exacerbated by the increasing use of "run-flat" tires. A run-flat tire enables a vehicle to travel an extended distance after a significant loss of air pressure within the tire through the use of, for example, stiff tire sidewalls. Thus, even a significant loss of air pressure within the tire may go unrecognized by a vehicle operator because the loss of air pressure may cause only a small deflection of the sidewall. Because the sidewall is capable of maintaining the shape of an under-inflated tire, the handling characteristics of the vehicle during typical operation may not be affected. However, the under-inflation can seriously affect handling in an emergency situation where the stresses placed on the tire can be much greater than during typical operation. For these and other reasons, proper air pressure is important to the safe and efficient operation of a motor vehicle.

Since air pressure is typically overlooked as part of vehicle maintenance, systems have been developed to inform vehicle operators of low-pressure situations. These systems are typically sold as part of a factory installed package with new vehicles.

Various tire pressure monitoring systems have been developed to provide information to a vehicle operator, for example, a tire pressure monitoring system that detects when air pressure within a tire drops below a predetermined threshold pressure value.

Typically, a tire pressure monitoring system comprises a tire pressure sensor, a tire pressure signal transmitter, a tire pressure signal receiver, and an indicator or display located on a vehicle instrument panel. The tire pressure sensor and the tire pressure signal transmitter are located inside the tire. The tire pressure sensor may transmit radio frequency signals through the transmitter that are received by an antenna located in the vehicle.

Tire pressure sensors have been developed with various designs. For example, tire pressure sensors and transmitters have been attached to air valves. Another system utilizes a strap to attach the sensor and transmitter to a rim.

While the tire pressure monitoring systems are useful to vehicle operators, the systems are typically standalone systems having dedicated wiring and interfaces.

Therefore, a need exists for an integrated monitoring system for monitoring tire air pressure and vehicle security.

SUMMARY OF THE INVENTION

According to an embodiment of the present invention, a vehicle monitoring system comprises a tire pressure sensor, a transmitter coupled to the tire pressure sensor for wirelessly transmitting a signal indicative of a tire pressure, and a receiver for receiving the signal indicative of the tire pressure and for receiving a signal of a remote keyless entry device. The vehicle monitoring system further comprises a controller coupled to the receiver for processing the signal indicative of the tire pressure and outputting a status signal, and a status indicator for receiving the status signal and indicating a tire pressure status according to the status signal.

The transmitter and the remote keyless entry device transmit signals on a shared frequency, wherein the signals are received by the receiver. The transmitter and the remote keyless entry device transmit signals on different frequencies, wherein the signals are received by the receiver.

The remote keyless entry device comprises the status indicator.

The controller comprises a timer, wherein the controller periodically polls the tire pressure sensor.

The tire pressure sensor is responsive to a signal of the remote keyless entry device for controlling a security system.

The vehicle monitoring system comprises a power source coupled to the tire pressure sensor. The power source is a battery. The power source is a transducer for converting a signal into a current. The signal is transmitted by the remote keyless entry device. The signal is transmitted by the controller.

According to an embodiment of the present invention, a vehicle monitoring method comprises generating a signal for controlling a vehicle security system, receiving the signal for controlling a vehicle security system at a tire pressure monitor, generating a tire pressure signal in response to the signal for controlling the vehicle security system, and receiving the signal for controlling a vehicle security system and the tire pressure signal at a controller.

The method further comprises performing an operation of the vehicle security system according to the signal for controlling a vehicle security system, and generating a indication of tire pressure in response to the tire pressure signal.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
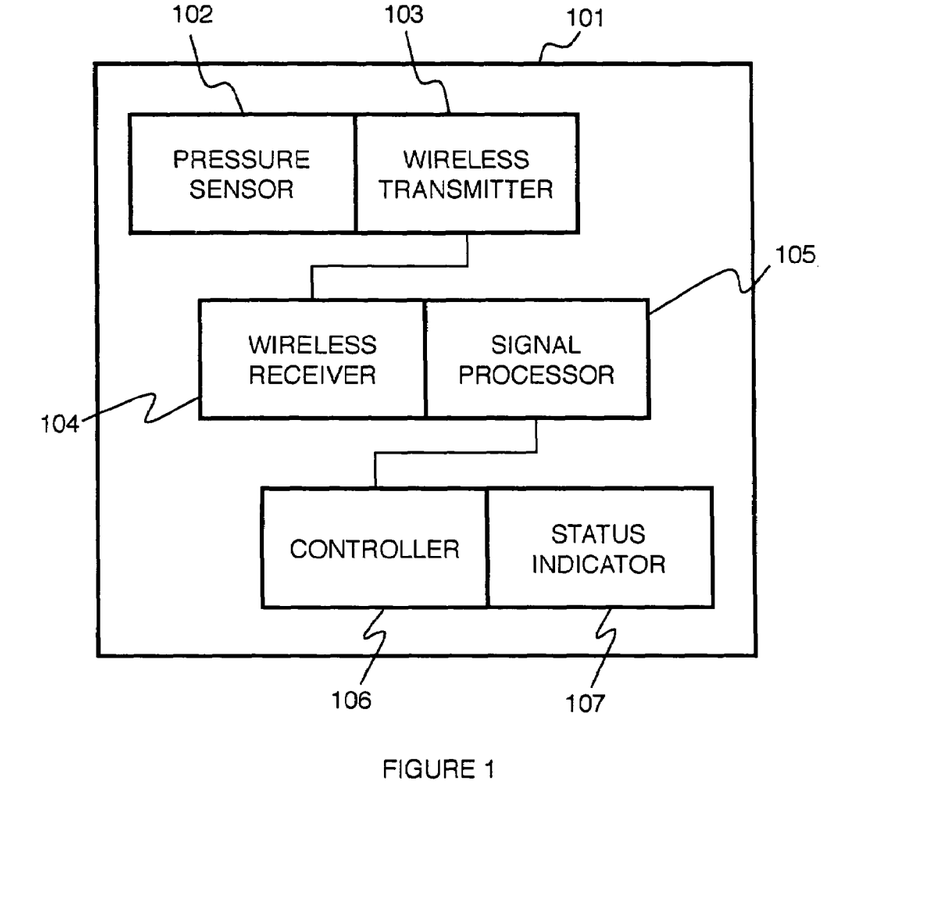
FIG. 1 is an illustration of an integrated monitoring system according to an embodiment of the present invention.

According to an embodiment of the present invention, an vehicle monitoring system 101 comprises a pressure sensor 102, a wireless transmitter 103, a wireless receiver 104, and a signal processor 105, as shown in FIG. 1. The air pressure monitoring system 101 further comprises a controller 106 and a status indicator 107. The wireless transmitter 103 and wireless receiver 104 can operate on a frequency used by an integrated vehicle security system. The vehicle security system comprises a wireless key FOB for controlling, for example, the locking and unlocking vehicle doors and arming and disarming the security system. The vehicle security system comprises the wireless receiver 104, the signal processor 105, and the controller 106 for operating security/convenience features.

The pressure sensor 102 can have any form that determines air pressure. For example, the pressure sensor 102 can be one of a capacitive type sensor, an inductive type sensor, and a piezoelectric type sensor. The capacitive type sensor comprises a plate that moves in response to a change in air pressure. The inductive type sensor comprises a coil or core that moves in response to a change in air pressure. The piezoelectric type sensor comprises a piezo crystal that deforms in response to a change in air pressure. The pressure sensor 102 can comprise a sealed vacuum reference to compare against a current air pressure as measured by the movement of the plate or coil, or the deflection of the piezo crystal.

Figure 2:
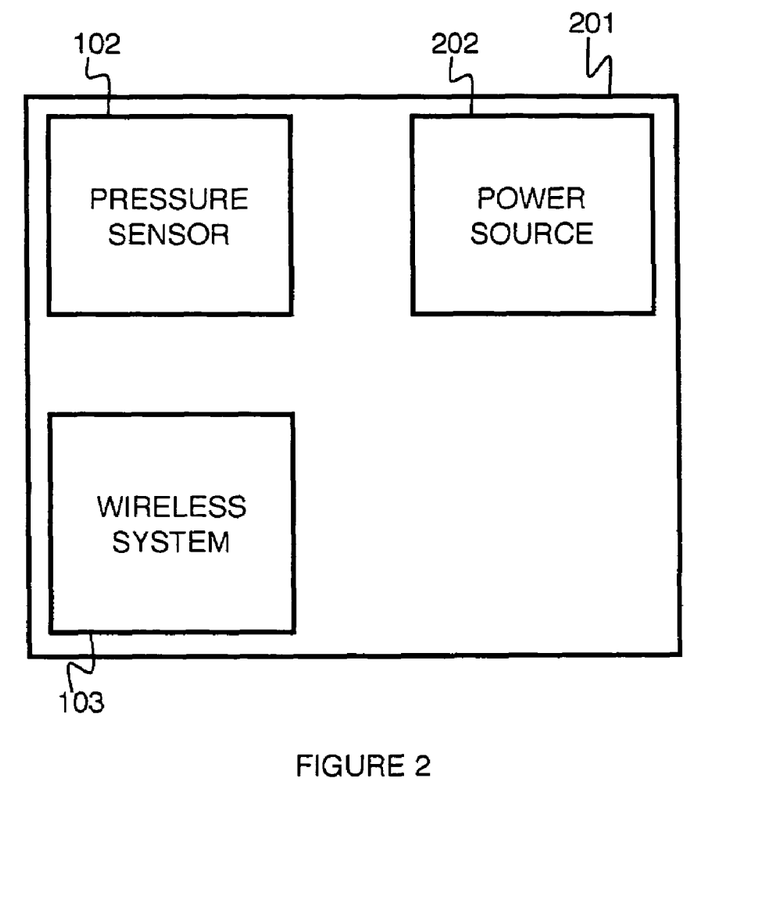
FIG. 2 is an illustration of an air pressure sensor according to an embodiment of the present invention.

According to an embodiment of the present invention, the pressure sensor 102 is coupled to the wireless transmitter 103 for transmitting a signal indicative of a air pressure, as shown in FIG. 1. Referring to FIG. 2, the pressure sensor 102 and wireless transmitter 103 are located in a vehicle tire 201. The pressure sensor 102 and wireless transmitter 103 can be, for example, strapped to a rim or connected to an air valve stem. A power source 202 is coupled to the pressure sensor 102 and wireless transmitter 103. The power source 202 comprises a battery and/or a transducer for converting a signal, for example, as transmitted by the wireless key FOB of the vehicle security system, into a current. The power source 202 provides power to the pressure sensor 102 and the wireless transmitter 103.

A wireless system comprises the wireless transmitter 103 mounted in the tire, and the receiver 104 located outside of the tire. The transmitter 103 located in the tire provides remote access to a receiver/controller in the vehicle or in a key FOB. The transmitter 103 transmits signals indicative of tire pressure to the receiver 104. The signal indicative of tire pressure can be decoded by the signal processor 105 and handled by the controller 106. The controller outputs a signal to the status indicator 107 based on a decoded signal for display to a vehicle operator. The receiver 104, signal processor 105, controller 106 and status indicator 107 can be located in the vehicle and/or in a key fob.

The wireless transmitter 103 comprises an antenna and a circuit for generating a signal of a desired frequency. A transmission of the wireless transmitter 103 occurs in response to a variation in tire air pressure. The transmission can be on a licensed frequency or an unlicensed frequency. The frequency is shared between the vehicle security system and the tire pressure monitoring system. A separate frequency can be used by the tire pressure monitoring system. However, the receiver 104 is shared between the security system and the tire pressure monitoring system.

Figure 3:
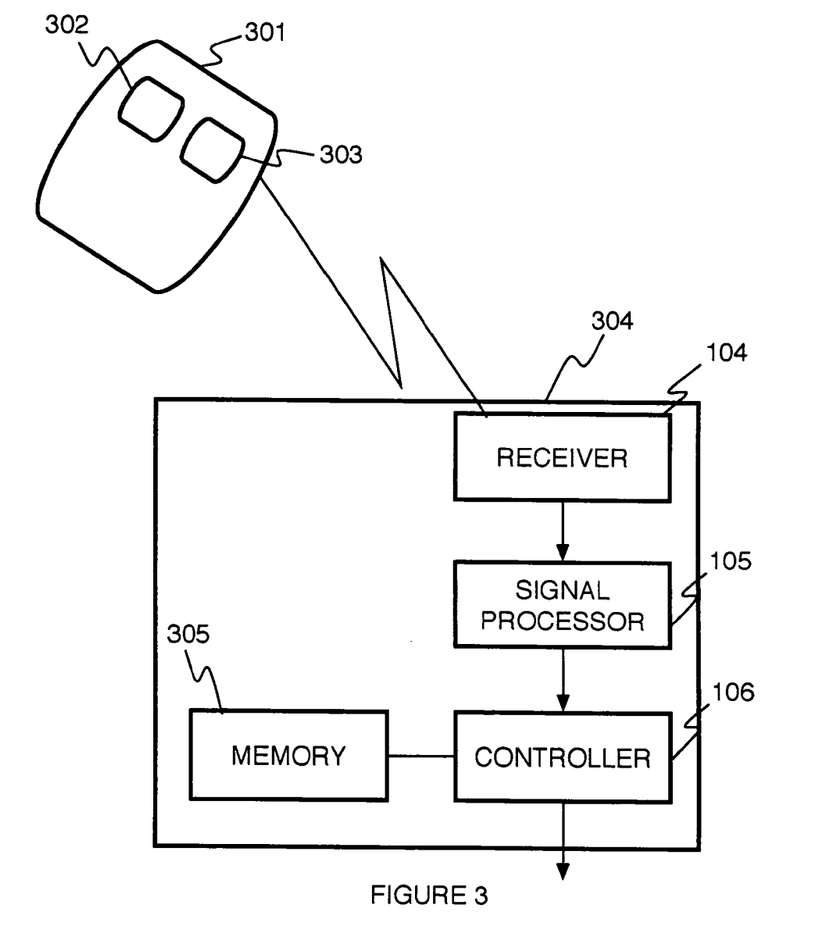
FIG. 3 is an illustration of a control system for a vehicle security system and an integrated tire pressure monitor according to an embodiment of the present invention.

FIG. 3 is an illustration of a vehicle monitoring system according to an embodiment of the present invention. A transmitter 301, comprises controls, for example, buttons 302 and 303. Activation of a button or a combination of buttons produces a pulse code modulated (PCM) signal, e.g., of 16 bits in the 275–310 MH range. While the PCM signal is described having 16 bits, other length signals and coding may be used.

The wireless receiver 104 is located in a vehicle 304 and receives the PCM signal from the wireless transmitter 103. The signal processor 105, also located in the vehicle 304, amplifies the received PCM signal, demodulates the PCM signal, and passes the signal to the controller 106. The controller 106 receives the incoming signal from the signal processor 105 and compares or verifies the signal with a code stored in a memory 305, which may be an E.sup.2 PROM (not shown) in the controller unit 106. If the code is verified, then an output signal is provided on an output terminal and lead of the controller 106. The output signal can control, for example, vehicle door looks, a status indicator 107, and vehicle windows.

A 12-volt DC power source (not shown), which may be an automobile battery, supplies power to a voltage regulator, which is connected to and powers the wireless receiver 104, the signal processor 105, the controller unit 106, and the status indicator 107.

Figure 4:
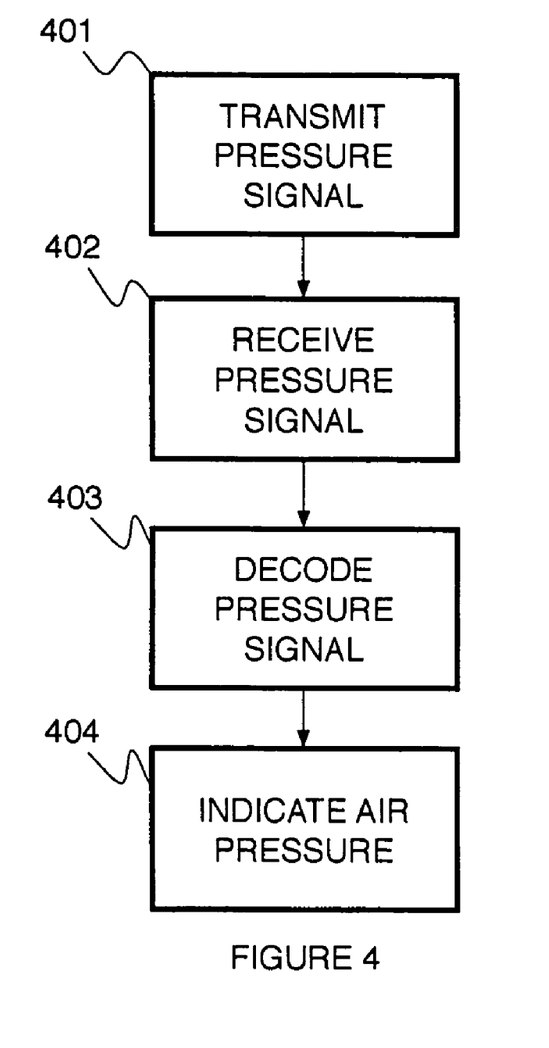
FIG. 4 is a flow chart of a method according to an embodiment of the present invention.
Figure 5:
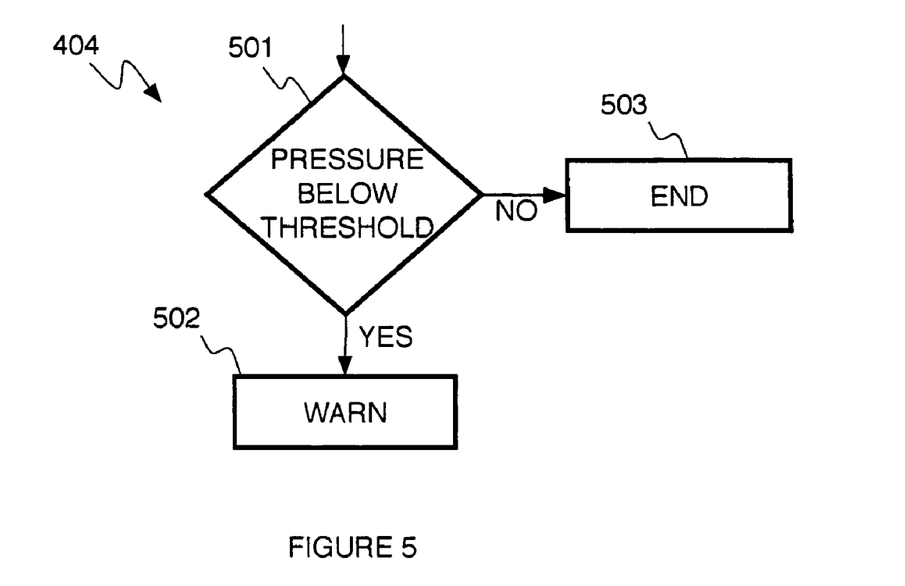
FIG. 5 is a flow chart of a method according to an embodiment of the present invention.

Referring to FIG. 4, a signal is transmitted 401 from the wireless transmitter and received 402 by the wireless receiver. The signal is decoded 403 and an indication of the pressure signal is generated 404. The indication is controlled by the controller 106 and communicated by the status indicator. The indication can be, for example, a numerical display in pounds per square inch, an audio warning, or discrete light emitting diodes corresponding to different pressures. Referring to FIG. 5, if a decoded signal is determined to be below a predetermined threshold 501 by the controller, a warning can be issued 502. The warning can be, for example, a visual and/or aural indication that the pressure is below a predetermined threshold. In this case, where the pressure is above the threshold, no action is taken 503.

The air pressure can be determined periodically while the vehicle is being operated, for example, once every 15 seconds. The controller includes a timer for controlling the period of tire pressure sensor polling. The air pressure can also be determined upon the happening of an event, for example, upon disarming the vehicle security system.

Figure 6:
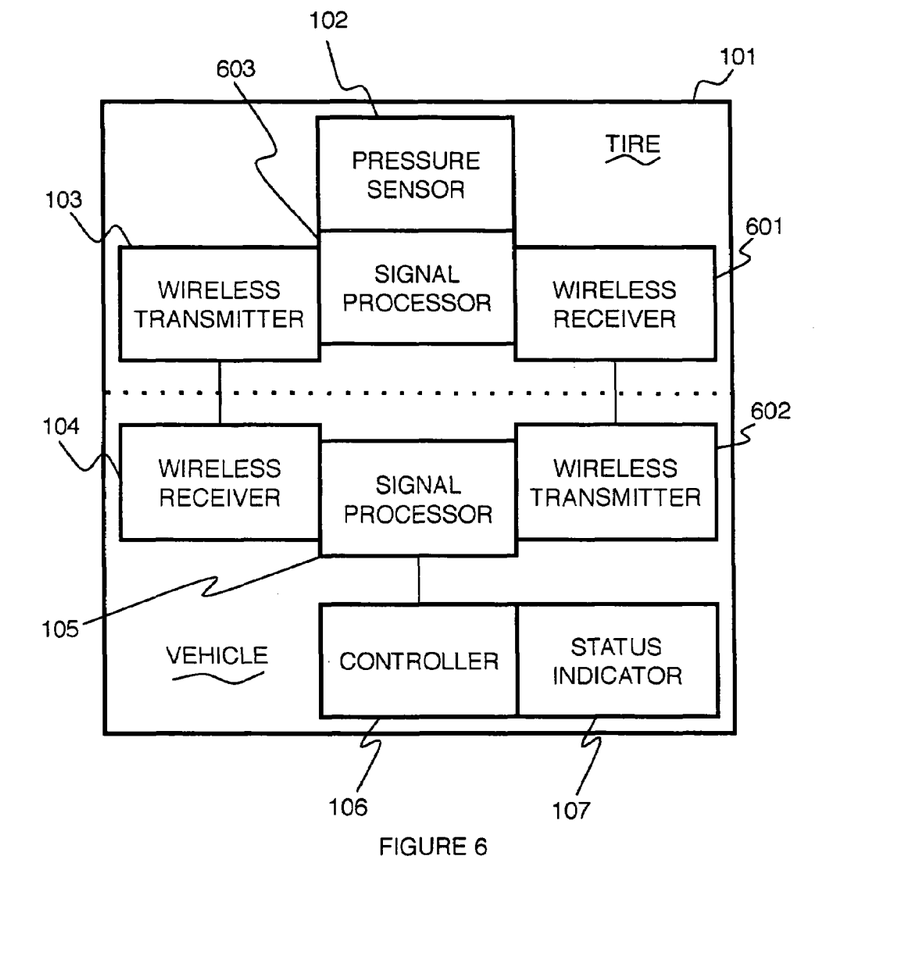
FIG. 6 is an illustration of an integrated monitoring system according to an embodiment of the present invention.

Referring to FIG. 6, the pressure sensor 102 is coupled to a second wireless receiver 601. The second wireless receiver 601 is located in the tire and receives transmissions from a second wireless transmitter 602, e.g., the key fob. Upon receiving the signal, the air pressure is determined and the wireless transmitter 103 transmits a signal to the wireless receiver 104. Further, a second signal processor 603 can be provided, coupled to the second wireless receiver 601, the pressure sensor 102, and the wireless transmitter 103, for decoding/encoding signals.

Figure 7:
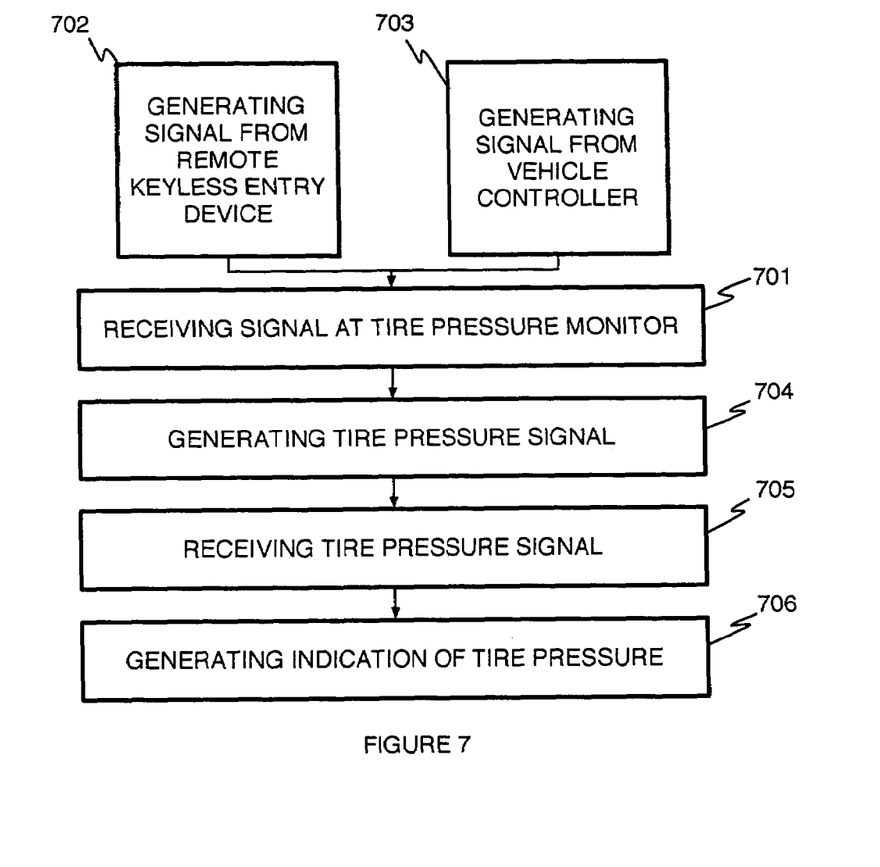
FIG. 7 is a flow chart of a method according to an embodiment of the present invention.

Referring to FIG. 7, a vehicle monitoring method comprises receiving the signal for controlling a vehicle security system at a tire pressure monitor 701. The signal can be generate by a remote keyless entry device 702 or by a controller 703. The method comprises generating a tire pressure signal in response to the signal 704, and receiving the tire pressure signal at a controller 705. An indication of tire pressure is generated 706.

Having described embodiments for tire pressure monitoring, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A vehicle monitoring system comprising:
   a tire pressure sensor;
   a transmitter coupled to the tire pressure sensor for wirelessly transmitting a signal indicative of a tire pressure;
   a receiver for receiving the signal indicative of the tire pressure and for receiving a signal of a remote keyless entry device;
   a controller coupled to the receiver for processing the signal indicative of the tire pressure and outputting a status signal; and
   a status indicator for receiving the status signal and indicating a tire pressure status according to the status signal.

2. The vehicle monitoring system of claim 1, wherein the transmitter and the remote keyless entry device transmit signals on a shared frequency, wherein the signals are received by the receiver.

3. The vehicle monitoring system of claim 1, wherein the transmitter and the remote keyless entry device transmit signals on different frequencies, wherein the signals are received by the receiver.

4. The vehicle monitoring system of claim 1, wherein the remote keyless entry device comprises the status indicator.

5. The vehicle monitoring system of claim 1, wherein the controller comprises a timer, wherein the controller periodically polls the tire pressure sensor.

6. The vehicle monitoring system of claim 1, wherein the tire pressure sensor is responsive to a signal of the remote keyless entry device for controlling a security system.

7. The vehicle monitoring system of claim 1, comprising a power source coupled to the tire pressure sensor.

8. The vehicle monitoring system of claim 7, wherein the power source is a battery.

9. The vehicle monitoring system of claim 7, wherein the power source is a transducer for converting a signal into a current.

10. The vehicle monitoring system of claim 9, wherein the signal is transmitted by the remote keyless entry device.

11. The vehicle monitoring system of claim 9, wherein the signal is transmitted by the controller.

12. A vehicle monitoring method comprising:
    generating a signal for controlling a vehicle security system;
    receiving the signal for controlling a vehicle security system at a tire pressure monitor;
    generating a tire pressure signal in response to the signal for controlling the vehicle security system; and
    receiving the signal for controlling a vehicle security system and the tire pressure signal at a controller.

13. A vehicle monitoring method of claim 12, further comprising:
    performing an operation of the vehicle security system according to the signal for controlling a vehicle security system; and
    generating a indication of tire pressure in response to the tire pressure signal.

* * * * *